March 11, 1958     V. BALASS     2,826,275
AUTOMATIC ADJUSTMENT AND SAFETY DEVICE FOR HYDRAULIC BRAKES
Filed July 7, 1953

INVENTOR,
Valentin Balass,
by Benjamin Joman,
Atty.

United States Patent Office 2,826,275
Patented Mar. 11, 1958

2,826,275

AUTOMATIC ADJUSTMENT AND SAFETY DEVICE FOR HYDRAULIC BRAKES

Valentin Balass, Zurich, Switzerland, assignor to Tecno Trade Anstalt, Mauren, Liechtenstein, a corporation of Liechtenstein Application July 7, 1953, Serial No. 366,597

Claims priority, application Switzerland July 23, 1952

10 Claims. (Cl. 188—152)

This invention relates to a hydraulic brake device for vehicle wheels, of the kind comprising means for producing a hydraulic pressure and a brake cylinder fed with liquid pressure from said pressure-producing means for operating the wheel brakes.

Known devices of this type have the disadvantage that the path to be travelled by the control operating the brake device, for example the brake pedal, before braking starts is not constant, but depends on the brake backlash at any given time. This backlash, however, is subject on the one hand to continuous fluctuations in consequence of thermal expansion and shrinking of parts of the device, and on the other hand to continuous variation resulting from wear, so that the necessity of periodic adjustment of the brake backlash is an additional disadvantage. In the case of motor vehicles having trailer vehicles, moreover, the path to be travelled by the brake pedal before braking starts increases substantially, if the brake system of the trailer vehicle is connected to that of the motor vehicle, since the space of the brake cylinders which in that case has to be filled with brake fluid is increased by at least half.

Ordinary hydraulic brake devices have the additional disadvantage that if a brake fluid pipe leaks, the entire brake system becomes ineffective, which may have serious consequences. Motor vehicles having trailers are especially exposed to this danger when the hydraulic brakes of the trailer vehicle are connected to the hydraulic brake system of the motor vehicle, since it is possible for the hydraulic connection, which is usually situated in an unprotected position, to be unintentionally broken between the motor vehicle and the trailer, so that both the brakes of the motor vehicle and those of the trailer will be put out of action.

The present invention aims at obviating the foregoing disadvantages. Another objective is to provide a device which functions not only as an automatic safety shut-off but also as an automatic regulating or adjusting device for maintaining in the brake cylinder and in the fluid line leading to it, an amount of brake fluid corresponding to the clearance that actually exists between the braking surfaces. The amount of fluid is automatically decreased if this clearance is less than normal, and automatically increased if it is greater than normal.

To this end, the automatic adjustment and safety device of the present invention comprises firstly a regulating device which regulates the flow of the brake fluid out of the pressure-producing means and the return flow from the brake cylinder, and by means of which the brake backlash is automatically adjusted by regulating the filling of the brake cylinder, and secondly an automatic shut-off device by which the brake fluid is prevented from flowing out of the pressure-producing means in the event of a leak occurring between the regulating device and the brake cylinder.

In hydraulic brake systems having a main or master cylinder for generating the hydraulic pressure, the regulating device and the shut-off device preferably form parts of an auxiliary cylinder disposed in the path of flow of the brake fluid between the main cylinder and the brake cylinder and rigidly connected to the main cylinder, said auxiliary cylinder serving as a combined adjusting and safety device for the brake system. It is advisable to secure the auxiliary cylinder either directly to the main cylinder by means of flanges, or to connect it thereto by a pipe which is as short as possible.

The auxiliary cylinder has a pressure chamber which is connected to the brake cylinder in such a way that in normal operation, the brake fluid flows freely in both directions between the brake cylinder and the pressure chamber, but when the pressure falls below a predetermined value the connection between the pressure chamber and the brake cylinder is interrupted. Said auxiliary cylinder has valve means which operate automatically to feed extra fluid from a supply to the pressure chamber when the clearance between braking surfaces is greater than a desired normal amount, and to allow fluid to escape from the pressure chamber to the supply when the clearance between braking surfaces is less than desired. This withdrawal or addition of fluid occurs during a single operation of the brake pedal or equivalent control, so that during subsequent operations the braking effect occurs at the same predetermined position of the brake pedal.

For the purpose of achieving uniform brake action on both sides of the vehicle, the brake cylinders of wheel pairs may be in communication with one auxiliary cylinder or with a plurality of auxiliary cylinders connected to the main cylinder. In order to derive maximum advantage from the safety device of the present invention, it is advisable to provide one auxiliary cylinder for each pair of wheels to be braked, since in such a case, in the event of the brakes of one pair of wheels being put out of action, all other brakes will still remain effective.

In motor vehicles having trailer vehicles, either only one auxiliary cylinder may be provided for the trailer vehicle, or at least one auxiliary cylinder for each of the motor and trailer vehicles may be connected to the main cylinder of the motor vehicle, and in the path of flow of the brake fluid between the auxiliary cylinder and the brake cylinders of the trailer vehicle a hose coupling may be provided, by means of which the connection between the auxiliary cylinder and the brake cylinders may be interrupted and restored without substantial alteration of the pressure of the fluid in the auxiliary cylinder and in the brake cylinders.

In order to enable the invention to be more readily understood, reference is made to the accompanying drawings which illustrate diagrammatically and by way of example, two embodiments thereof, and in which.

Figure 1:
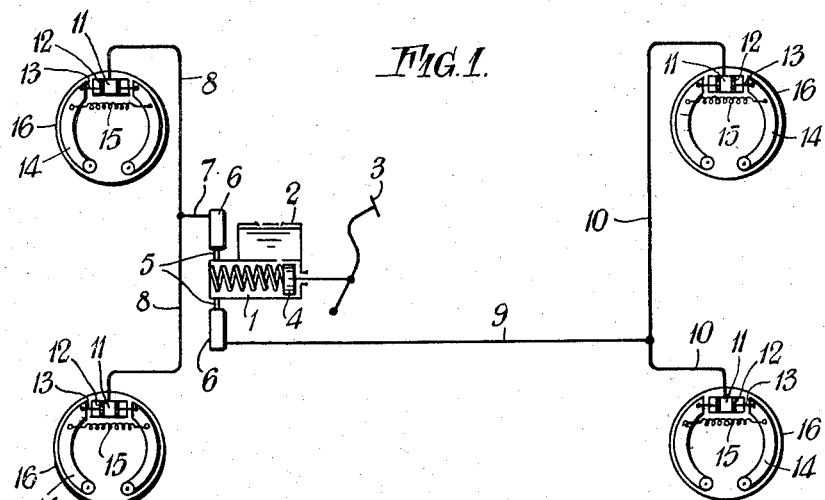
Fig. 1 illustrates one embodiment of an automobile hydraulic brake system having two auxiliary cylinders.

In the embodiment illustrated in Figure 1, the brake system comprises a main or master cylinder 1, a brake fluid container 2 communicating therewith, a piston 4 which places the brake fluid under pressure on depression of the brake pedal 3, two auxiliary cylinders 6 communicating with the main cylinder 1 by short pipes 5, four brake cylinders 11 communicating with the auxiliary cylinders 6 through pipes 7, 8, 9, 10, respectively, and pairs of brake shoes 14 which are operated by each brake cylinder 11 by means of the two pistons 12 and piston rods 13. When braking is to take place, the shoes 14 are pressed against the corresponding brake drums 16 of the automobile wheels (not shown), against the urgence of the restoring springs 15. Each restoring spring 15 pulls the two brake shoes 14, and hence also the two pistons 12, toward each other when the brake is released, and holds the brake fluid in the brake cylinder 11 under an initial pressure.

The auxiliary cylinders 6 have the double task of (1) automatically keeping within normal bounds the backlash between the brake shoes 14 and the brake drums 16, that is to say of regulating the brake fluid filling of the brake cylinders 11 in such a manner that the commencement of braking takes place at a constant, predetermined position of the brake pedal 3, and (2) of automatically preventing the passage of the brake fluid when the initial pressure of the brake fluid has fallen below the normal value. If, for example, the pipe 7 bursts, the flow of brake fluid to that pipe is prevented, so that, although the front wheel brakes become inoperative, the rear wheel brakes, which have their own auxiliary cylinder 6, remain fully effective, since, despite the break in the line, the brake fluid cannot escape from the main cylinder 1.

Figure 2:
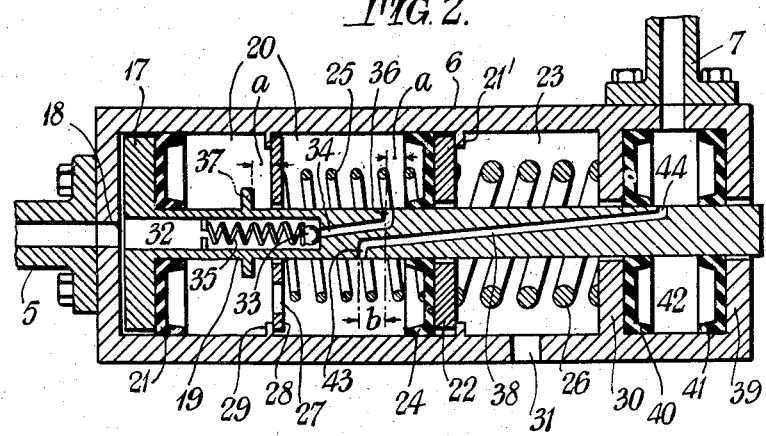
Fig. 2 is a longitudinal section through an auxiliary cylinder according to the invention, on a larger scale.

The construction of the auxiliary cylinders 6 is illustrated in Figure 2. In this figure, 17 denotes a differential piston slidable in the auxiliary cylinder 6. The larger operative surface of the piston faces what may be termed a low pressure chamber 18 in communication with the main cylinder 1 (Figure 1) by means of the pipe 5, while the operative surface which is smaller by the amount of the cross-sectional area of the piston rod 19 faces what may be termed a high pressure chamber 20. The differential piston 17 carries a sealing sleeve 21 forming one end wall of the pressure chamber 20 and serving as a valve device, since under certain conditions it permits the passage of brake fluid from the chamber 18 into the pressure chamber 20, but does not ever permit the brake fluid to flow in the reverse direction. The pressure chamber 20 is bounded at the other end by an axially slidable wall, which consists of an annular washer 22 bearing in normal operation against a stop 21' and of a sealing sleeve 24 sealing the pressure chamber 20 from the air chamber 23. The sealing device 22, 24 is loaded on the one hand by a pre-stressed compression spring 25 disposed inside the pressure chamber 20, and on the other hand by a more powerful, pre-stressed compression spring 26 disposed in the space 23. At its other end the spring 25 presses an axially slidable annular washer 28, provided with a pressure equalisation aperture 27, against a stop 29, so that the washer 28 and the stop 29 form together a pre-tensioning device for the spring 25. The other end of the spring 26 is supported against a wall 30 of the space 23. This space is provided with an air inlet aperture 31. The springs 25 and 26 are so selected that the force of the spring 25, together with the force of the brake fluid in the pressure space 20, holds the sealing device 22, 24 against the stop 21', overcoming the force of the spring 26.

The differential piston 17 and the piston rod 19 have a bore 32, which is in communication through a non-return valve 33 with an escape passage 34 formed in the piston rod 19 and leading to the pressure chamber 20. The non-return valve 33 is kept seated by a spring 35, which yields when the pressure of the brake fluid in the pressure chamber 20 exceeds a predetermined value and thus permits some of the brake fluid to overflow from the high pressure chamber 20 into the low pressure chamber 18. The opening 36 at the high pressure chamber end of the passage 34 is so disposed that it is closed by the sealing sleeve 24 when the piston rod 19 is displaced axially out of the zero position illustrated by a distance $a$ corresponding to the desired clearance between the braking surfaces 14, 16. A similar closing of the passage 34 occurs when the sealing device 22, 24 is displaced the same distance in the opposite direction.

There is an annular flange 37 on the piston rod 19 which encounters and bears against the washer 28 after the piston and piston rod have made an initial advance through the distance $a$. The parts 28 and 25 serve as a resiliently yieldable stroke-impeding means which becomes effective upon completion of this piston movement.

The piston rod 19 has a further passage 38, which establishes communication between the pressure chamber 20 and a space 42 bounded on one side by the wall 30 and on the other side by the end wall 39. The space 42 is sealed by the sealing sleeves 40 and 41. This space 42 is in communication with the brake cylinders 11 through the pipes 7, 8 and 9, 10 respectively (Figure 1).

The inner opening 43 at the pressure chamber end of the passage 38 is at a distance $b$ from the opening 36 of the passage 34 in the direction of the differential piston 17, so that the opening 43 is closed by the sealing sleeve 24 only after an axial displacement of the piston rod 19 or of the sealing device 22, 24 by the distance $a+b$. The other opening 44 of the passage 38 is situated at such a distance from the sealing sleeve 41 that it is not closed by the sealing sleeve 41 even at the maximum axial displacement of the piston rod 19.

The mode of operation of the aforedescribed arrangement is as follows:

When the brake pedal 3 (Figure 1) is depressed, the piston 4 of the main cylinder 1 delivers brake fluid through the pipe 5 into the chamber 18 (Figure 2) of the auxiliary cylinder 6, as a result of which the differential piston 17 is displaced to the right, whereby brake fluid is forced out of the pressure chamber 20 through the passage 38 into the chamber 42, and thence through the pipes 7, 8 and 9, 10 respectively into the brake cylinders 11, until the pistons 12 of the brake cylinders 11 have applied the brake shoes 14 against the brake drums 16, i. e. the brake backlash has been overcome. During this operation the non-return valve 33 remains closed, since the spring 35 is of such strength that it is able to withstand an initial pressure of the brake fluid in the pressure chamber 20 produced by the restoring springs 15 (Figure 1). At the same time, the sealing sleeve 21 permits no brake fluid to flow over from the space 18 into the space 20, since on the displacement of the differential piston 17 from left to right, which occurs against only slight resistance, the fluid pressure on the right-hand side of the piston is greater than on the left-hand side of the piston, in consequence of the smaller effective piston area.

If the brake backlash corresponds from the outset to the normal value, the brakes will be applied, even on the first depression of the brake pedal 3, exactly at the moment when the flange 37 has arrived at the annular washer 28 after the axial displacement of the differential piston 17 by the distance $a$. At the same time the opening 36 has also been displaced axially by the amount $a$, so that the passage 34 is now closed by the sealing sleeve 24. Therefore the braking action can begin immediately, since not only has the brake backlash been overcome, but also the pressure fluid in the pressure space 20 has a free path through fluid feeding passage 38 to the brake cylinders 11.

If however the brake backlash is abnormally small (for example in consequence of excessively thick brake linings), then on the first depression of the brake pedal 3 the brake shoes 14 are applied even before the flange 37 has reached the annular washer 28. In this case, on the further movement of the flange 37 towards the annular washer 28, the filling of the respective brake cylinder or cylinders 11 remains constant, since the pistons 12 cannot be pressed farther apart, and the excess brake fluid is allowed to escape from the pressure chamber 20 through the still open passage 34 and the non-return valve 33 into the space 18. As a result, despite the excessively small backlash the braking can start, as in the normal case, at the moment when the flange 37 comes into contact with the annular washer 28 after displacement through the distance a.

If the brake is released again, the initial pressure of the brake fluid in the pressure chamber 20 presses the differential piston 17 into the zero position illustrated. Since however a portion of the brake fluid corresponding to the reduction of the brake backlash had previously been displaced out of the pressure chamber-brake cylinder system, and since no brake fluid flows thereafter into the system, the brake backlash is automatically adjusted to the normal value. Consequently when the hereindescribed arrangement is used, the path travelled by the brake pedal when first depressed, up to the point where actual braking commences, is equal to that in the case of normal brake backlash, despite the actual fact that the brake backlash is too small; and on the second and subsequent depressions the braking effect will always commence at the same position of the brake pedal.

In the case of abnormally large brake backlash (for example in the case of heavily worn brake linings), some backlash still remains when the flange 37 has arrived at the annular washer 28. The further movement of the flange 37 is however opposed by the correspondingly heavily pre-stressed spring 25, so that on the right-hand side of the differential piston 17 the pressure remains constant, while on the left-hand side of the differential piston 17 the fluid pressure continuously rises under the action of the brake pedal 3. This pressure finally attains a higher value than on the right-hand side, whereupon brake fluid flows out of the space 18 around sealing member 21 into the pressure chamber 20, thence into the brake cylinder or cylinders 11 to compensate for the residual backlash by increasing the brake cylinder filling. After the pressure has thus been equalised between the left-hand and right-hand sides of the differential piston 17, the brake fluid commences under the further action of the brake pedal 3 to apply braking pressure to the brake shoes 14. At the same time there is again established in the pressure chamber 20 a higher pressure than in the chamber 18, in consequence of the differential action of the piston 17, so that no more brake fluid can pass from chamber 18 into pressure chamber 20. On the release of the brake pedal 3, the differential piston 17 is displaced by the distance a back into its zero position illustrated, and in consequence an amount of brake fluid corresponding to this increase of volume flows out of the brake cylinder or brake cylinders 11 into the pressure chamber 20, whereby the brake backlash is automatically adjusted to the normal value. The brake backlash, which was initially too great, therefore influences the travel of the brake pedal only on the first depression thereof, while in consequence of the described overflow of an amount of fluid corresponding to the residual backlash, out of the chamber 18 into the pressure chamber 20, the braking effect during all subsequent depressions will commence at the same position of the brake pedal.

If a leak should occur in the area bounded by the auxiliary cylinder 6 and the brake cylinder 11, for example if the pipe 7 bursts, the pressure in the pressure chamber 20 immediately drops. After a relatively small loss of brake fluid, this results in the closing of the pressure chamber 20, since when pressure falls with the brake released the sealing device 22, 24, under the action of the spring 26, is displaced to the left and closes the opening 43 of the passage 38, and if pressure falls while the brake is being operated the piston rod 19 is displaced to the right until the opening 43 of the passage 38 comes to lie beneath the sealing sleeve 24. Thus in either case no more brake fluid can escape from the pressure chamber 20. If in the latter case the brake is then released, the entire pressure chamber 20 while remaining closed in this manner is displaced under the pressure of the spring 26 to the left as far as the initial position of the differential piston 17. During this displacement the distance between the differential piston 17 and the sealing device 22, 24 remains unchanged, since the amount of fluid in the pressure chamber 20 can neither increase nor decrease. Due to the fact that the auxiliary cylinder 6 prevents the brake fluid from flowing out of the main cylinder 1 through the leak, those parts of the brake system which are connected either to a second auxiliary cylinder 6 or directly to the main cylinder 1, continue to remain in operation.

If a braking device is operated before the leak is repaired, the closed pressure chamber 20 is displaced through the entire distance a+b and because of this the travel of the brake pedal 3 before braking starts is correspondingly increased. The driver's attention is thus drawn to the presence of a leak in the braking system.

Figure 3:
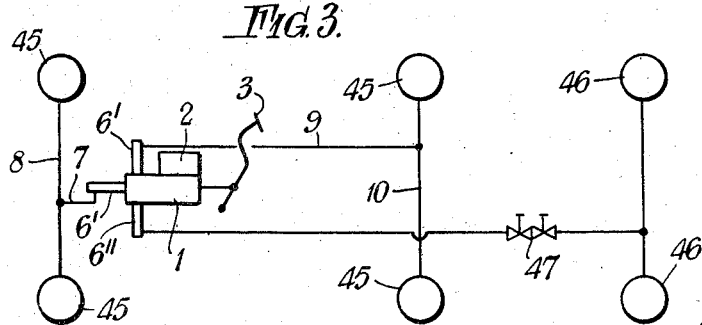
Fig. 3 illustrates an embodiment of a brake system having three auxiliary cylinders for an automobile having a trailer.

As an alternative to the arrangement illustrated in Figure 1, Figure 3 shows schematically the braking system of an automobile having a single-axle trailer. In addition to the two auxiliary cylinders 6' for the brakes of the automobile wheels 45, an auxiliary cylinder 6" for the brakes of the trailer wheels 46 is also connected to the main cylinder 1. All three auxiliary cylinders 6', 6" are mounted directly on the main cylinder 1. Between the auxiliary cylinder 6" and the brake cylinders of the wheels 46 there is a hose coupling 47, by which the hydraulic systems of the automobile and trailer can be separated from one another and re-connected without any substantial loss of brake fluid, so that practically no variation of pressure occurs on either side in consequence of coupling or uncoupling of the trailer. When the trailer is uncoupled, the differential piston 17 (Figure 2) of the auxiliary cylinder 6" is also displaced the distance a to the right on the depression of the brake pedal 3, whereby brake fluid is displaced from the pressure chamber 20 through the non-return valve 33 into the chamber 18. On the release of the brake pedal, the pressure chamber 20, thus reduced to a uniform size, is moved the distance a away from the stop 21' under the action of the spring 26, and on further depression of the brake pedal 3 is pushed back again the same distance a, so that the brake pedal travel remains always the same, irrespective of whether the trailer is attached to the automobile or not. The auxiliary cylinder 6" has the further effect that when a leak occurs in the hydraulic system of the trailer, or even if the trailer should break away, the escape of the brake fluid from the main cylinder 1 is prevented in the manner hereinbefore described, so that the brake system of the automobile remains fully operative.

In the case of two-axled trailers, the auxiliary cylinder 6" can be connected to the brake cylinders of all wheels, or each pair of wheels on the trailer can have its own auxiliary cylinder. Or there may be connected to the main cylinder of the automobile only a single auxiliary cylinder for the trailer, or one auxiliary cylinder for the automobile and one for the trailer.

The arrangement of the present invention is obviously also suitable for military vehicles with trailing military equipment.

Having thus described my invention, I claim:

1. In a hydraulic brake system including a brake drum, a brake shoe therefor, a brake cylinder and piston for actuating said shoe, a master cylinder affording a supply of brake fluid, and a fluid line between said cylinders: an automatic adjustment and safety device in said fluid line comprising an auxiliary cylinder, a piston slidable therein and having opposite faces of unequal areas, the cylinder space on the side of the larger piston face being a low pressure chamber in communication with the master cylinder, the space on the other side of the piston being a high pressure chamber in communication with the brake cylinder, the advancement of said differential piston serving to force fluid from said high pressure chamber to said brake cylinder, a resiliently yieldable stroke impeding means in said high pressure chamber positioned to impede the piston after an initial piston advancement corresponding to the desired clearance between brake drum and brake shoe, a fluid escape passage from the high pressure chamber to the low pressure chamber, a spring-pressed non-return valve at the low pressure end of said passage, and means operative to close said passage at its high pressure end at the completion of said initial piston movement and to maintain it closed during further advancement of the piston.

2. In an automatic adjustment and safety device, the combination set forth in claim 1, in which the differential areas of the piston faces are provided by mounting the piston on the end of a piston rod that extends through said high pressure chamber and through the end wall of the cylinder.

3. In an automatic adjustment and safety device, the combination set forth in claim 1, in which the differential areas of the piston faces are provided by mounting the piston on the end of a piston rod that extends through said high pressure chamber and through the end wall of the cylinder, said escape passage being formed in said piston rod, and said passage-closing means being a sealing sleeve carried by said end wall and adapted to cover the high pressure end of said passage.

4. In an automatic adjustment and safety device, the combination set forth in claim 1, in which said piston is provided with a resiliently yieldable sealing sleeve that allows passage of fluid from the low pressure chamber to the high pressure chamber but not in the reverse direction.

5. In an automatic adjustment and safety device, the combination set forth in claim 1, in which the piston is mounted on the end of a piston rod that extends through the high pressure chamber and through the end wall of the cylinder, and in which said communication between the high pressure chamber and the brake cylinder includes a fluid feeding passage formed in said piston rod.

6. In a hydraulic brake system including a brake drum, a brake shoe therefor, a brake cylinder and piston for actuating said shoe, a master cylinder affording a supply of brake fluid, and a fluid line between said cylinders: an automatic adjustment and safety device in said fluid line comprising an auxiliary cylinder, a piston slidable therein and having opposite faces of unequal areas, the cylinder space on the side of the larger piston face being a low pressure chamber in communication with the master cylinder, the space on the other side of the piston being a high pressure chamber in communication with the brake cylinder, the advancement of said differential piston serving to force fluid from said high pressure chamber to said brake cylinder, a fluid escape passage from the high pressure chamber to the low pressure chamber, a spring-pressed non-return valve at the low pressure end of said passage, and means operative to close said passage at its high pressure end at the completion of an initial piston movement corresponding to the desired clearance between brake drum and brake shoe, said means being also operative after a predetermined further advancement of the piston to close the communication between the high pressure chamber and the brake cylinder.

7. In an automatic adjustment and safety device, the combination set forth in claim 6, in which the piston is mounted on the end of a piston rod that extends through said high pressure chamber and through the end wall of the cylinder, said escape passage being formed in said piston rod, said communication between the high pressure chamber and the brake cylinder including a fluid feeding passage formed in said piston rod, the high pressure end of the escape passage lying further from the piston than the inner end of the fluid feeding passage, and said passage-closing means being a sealing sleeve carried by said end wall and adapted to cover the ends of said passages at successive stages of piston advancement.

8. In a hydraulic brake system including a brake drum, a brake shoe therefor, a brake cylinder and piston for actuating said shoe, a master cylinder affording a supply of brake fluid, and a fluid line between said cylinders: an automatic adjustment and safety device in said fluid line comprising an auxiliary cylinder, a piston slidable therein and mounted on the end of a piston rod whereby one face of the piston is larger than the other, the cylinder space on the side of the larger piston face being a low pressure chamber in communication with the master cylinder, the space on the other side of the piston being a high pressure chamber in communication with the brake cylinder, said last-mentioned communication including a fluid feeding passage formed in said piston rod, said piston rod extending through said high pressure chamber and through the end wall of said cylinder, and means operative to close said passage after the completion of a predetermined advancement of the piston toward said end wall.

9. In an automatic adjustment and safety device, the combination set forth in claim 8, in which said passage-closing means is a sealing sleeve carried by said end wall and adapted to cover the inner end of said passage.

10. In an automatic adjustment and safety device, the combination set forth in claim 8, in which said passage-closing means is a sealing sleeve carried by said end wall and adapted to cover the inner end of said passage, and in which said end wall is mounted for movement into the cylinder to reduce the volume of said high pressure chamber, there being a stop means on the cylinder to limit the outward movement of said end wall, and a spring constantly urging said wall inwardly, said spring being of a strength sufficient to become effective upon said wall only when the fluid pressure in said high pressure chamber drops below a predetermined value.

References Cited in the file of this patent

UNITED STATES PATENTS

| | | |
|---|---|---|
| 2,345,811 | Harp | Apr. 4, 1944 |
| 2,523,172 | Wilson | Sept. 19, 1950 |
| 2,544,849 | Martin | Mar. 13, 1951 |
| 2,588,955 | Brannen | Mar. 11, 1952 |
| 2,593,192 | Rockwell | Apr. 15, 1952 |